Dec. 22, 1925.
E. J. GULICK
1,567,003
KEY SHAFT BEARINGS FOR MUSICAL INSTRUMENTS
Filed March 12, 1921
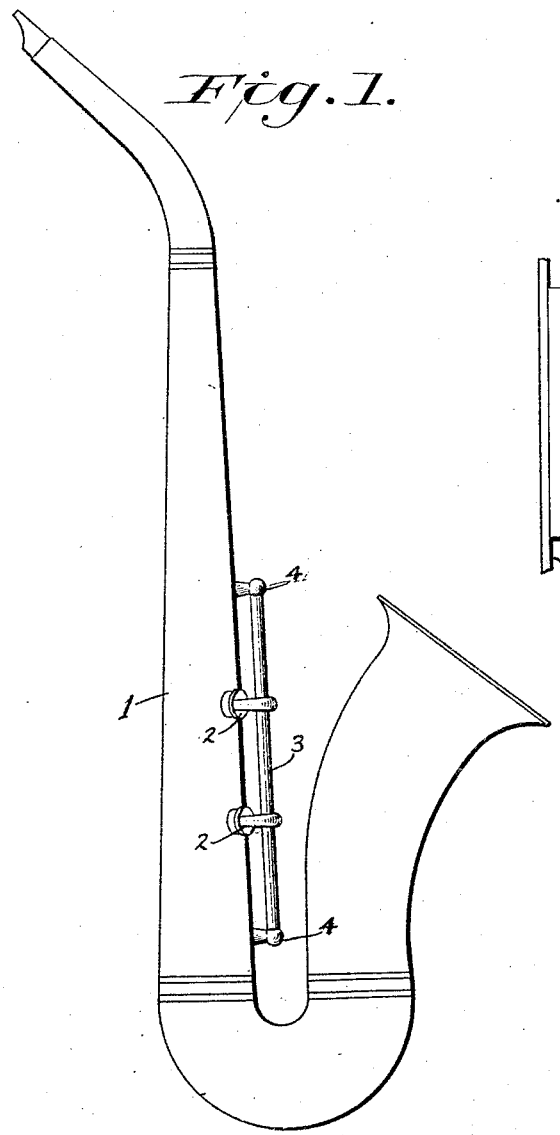
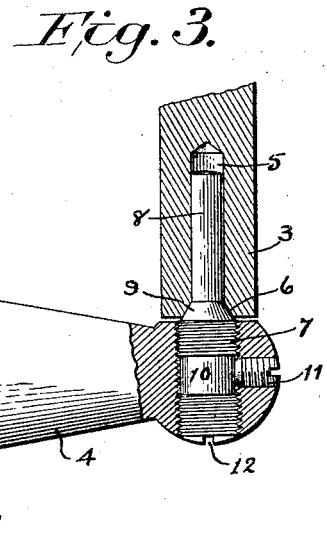
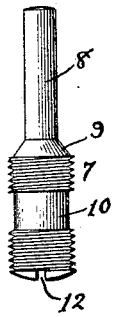
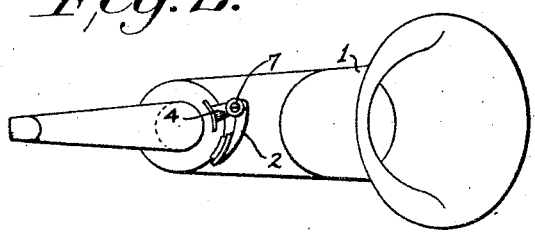
Inventor
Edward J. Gulick
By Louis C. Vanderlip,
Attorney Patented Dec. 22, 1925.

1,567,003

UNITED STATES PATENT OFFICE.

EDWARD J. GULICK, OF ELKHART, INDIANA, ASSIGNOR TO C. G. CONN, LTD., OF ELKHART, INDIANA, A CORPORATION OF INDIANA.

KEY-SHAFT BEARINGS FOR MUSICAL INSTRUMENTS.

Application filed March 12, 1921. Serial No. 451,869.

*To all whom it may concern:*

Be it known that I, EDWARD J. GULICK, a citizen of the United States, residing in the city of Elkhart, county of Elkhart, Indiana, have invented certain new and useful Improvements in Key-Shaft Bearings for Musical Instruments, of which the following is a specification.

My invention relates to wind musical instruments, and especially to key shaft bearings for saxophones, and the like.

An object of my invention is the production of an improved adjustable key-shaft mount for saxophones and the like.

Another object of the invention is the production of an improved key-shaft bearing or mount for saxophones, and the like, in which a compound bearing element is incorporated. Other objects of my invention are mentioned and described herein.

The preferred embodiment of my invention is illustrated in the accompanying drawing, in which Figure 1 is a view of a saxophone to which my invention is applied; Fig. 2 is an end view of the instrument shown in Fig. 1; Fig. 3 is an enlarged sectional view of the keyshaft, post, bearing pin and set screw for the latter; and Fig. 4 is a view of the compound bearing pin alone.

Similar numerals of reference indicate like parts throughout the several views on the drawing.

Referring to the details of the drawing, the numeral 1 indicates a wind musical instrument of the saxophone type which is provided with a plurality of the usual keys 2, 2, which keys may be rigidly mounted in any manner upon the key-shaft, or bar, 3, the latter being rotatively mounted upon the saxophone body exterior, as hereinafter described. In Figure 3 of the drawing a fragment is shown which includes one end of the key-shaft 3 which may be cylindrically bored at 5, the outer end of said bore terminating in the flaring conical bore 6. A bearing or pivot pin 7 may be screw threaded into the head of the post 4, which is rigidly secured to the exterior of the saxophone body, by welding or otherwise, and transversely of said post, which pin is provided with a cylindrical portion 8, adapted for arrangement within the shaft bore 5, and the conical or tapering thrust portion 9 which is adapted to engage the tapered shaft bore 6.

The bearing pin 7 may be provided also with a circumferential groove 10 which is preferably formed intermediate the longitudinal limits of the threaded portion of the pin, which groove is adapted to be engaged by the point of a set screw 11 threaded into the post 4 transversely of the arrangement of said pin to maintain the adjustment of the pivot pin 7. The head of the pin 7 may have a transverse slot 12 to receive any suitable tool for adjusting the pin in the threads formed in the post. Preferably, the shaft bore 5 is made slightly longer than the pin bearing portion 8 to enable longitudinal movement of the latter within said bore when the pin 7 is adjusted for wear in the bearings. It is intended that each end of the key-shaft 3 shall be carried by a pin 7 to enable adjustment from either end thereof. In devices of this character a very close fit between the ends of any member corresponding with my key-shaft 3 and the posts 4 must be effected to prevent endwise movement of the shaft where a plain cylindrical bearing is depended upon solely. In my device the ends of the key-shaft may be formed with considerable space between the posts 4 without detriment, for the adjustable compound pin 7 fully compensates for such spacing and also incorporates both a cylindrical and cone thrust bearing without depending wholly upon the cone bearing.

While I show my invention applied to a saxophone it will be readily appreciated by those skilled in the arts that it can be applied to other musical instruments without a departure from the spirit and scope of my invention.

I claim:

1. In a wind musical instrument, the combination with a rotatable key-shaft and a post, of a bearing pin telescopically connecting said shaft and post, said pin being provided with cylindrical and conical bearing sections and bodily adjustable axially of said key-shaft.

2. In a wind musical instrument, the combination with a rotatable key-shaft and a post, of a bearing pin telescopically connecting said shaft and post, said pin being provided with cylindrical and conical bearing sections, and said pin being bodily adjustable in said post and axially of said shaft.

3. In a wind musical instrument, the combination with a rotatable key-shaft and a post, of a bearing pin connecting said shaft and post, there being a cylindrical and conical bearing connection between said key-shaft and pin, and means for bodily adjusting said bearing pin axially of said key-shaft.

4. In a wind musical instrument, the combination with a hollow rotatable key-shaft and a bearing post, of a bearing pin adjustably mounted in said post and extending into the interior of said hollow shaft, said bearing pin being provided with integral cylindrical and conical bearing sections and adjustable axially of said key-shaft.

5. In a wind musical instrument, the combination with a hollow rotatable key-shaft and a bearing post, of a bearing pin carried by said post and extending into the interior of said hollow shaft, said bearing pin being provided with cylindrical and conical bearing sections, a complementary spiral connection between said bearing pin and post, and means on said pin to turn same in said spiral connection.

6. In a wind musical instrument, the combination with a hollow rotatable key-shaft and a bearing post, of a bearing pin carried by said post and extending into the interior of said hollow shaft, said bearing pin being provided with cylindrical and conical bearing sections, a complementary spiral connection between said bearing pin and post to enable adjustment of said pin axially of said key-shaft, and means in said post to maintain the adjustment of said bearing pin.

In testimony whereof I have hereunto affixed my signature this 5th day of March, 1921.

EDWARD J. GULICK.